(12) United States Patent
Ackley et al.

(10) Patent No.: US 10,884,059 B2
(45) Date of Patent: Jan. 5, 2021

(54) DETERMINING THE INTEGRITY OF A COMPUTING DEVICE

(71) Applicant: Hand Held Products, Inc., Fort Mill, SC (US)

(72) Inventors: H. Sprague Ackley, Seattle, WA (US); Jeffrey Mark Hunt, Kirkland, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 627 days.

(21) Appl. No.: 15/786,943

(22) Filed: Oct. 18, 2017

(65) Prior Publication Data

US 2019/0113571 A1  Apr. 18, 2019

(51) Int. Cl.
| | |
|---|---|
| *G06F 21/00* | (2013.01) |
| *G01R 31/3193* | (2006.01) |
| *G06F 1/14* | (2006.01) |
| *G01R 31/319* | (2006.01) |
| *G06F 11/22* | (2006.01) |
| *G06F 1/12* | (2006.01) |
| *G06F 21/57* | (2013.01) |

(52) U.S. Cl.
CPC .  *G01R 31/31937* (2013.01); *G01R 31/31922* (2013.01); *G06F 1/12* (2013.01); *G06F 1/14* (2013.01); *G06F 11/2268* (2013.01); *G06F 21/00* (2013.01); *G06F 21/57* (2013.01); *G06F 2221/034* (2013.01)

(58) Field of Classification Search
CPC ........ G01R 31/31937; G01R 31/31922; G06F 21/00; G06F 21/57; G06F 1/14; G06F 11/2268; G06F 1/12; G06F 2221/034
See application file for complete search history.

(56) References Cited

U.S. PATENT DOCUMENTS

| | | | |
|---|---|---|---|
| 5,040,158 A | * | 8/1991 | Lee .......................... G04G 7/00 368/10 |
| 6,832,725 B2 | | 12/2004 | Gardiner et al. |
| 7,128,266 B2 | | 10/2006 | Zhu et al. |
| 7,159,783 B2 | | 1/2007 | Walczyk et al. |
| 7,413,127 B2 | | 8/2008 | Ehrhart et al. |
| 7,726,575 B2 | | 6/2010 | Wang et al. |
| 8,294,969 B2 | | 10/2012 | Plesko |

(Continued)

FOREIGN PATENT DOCUMENTS

WO    2013163789 A1    11/2013

*Primary Examiner* — Kendall Dolly

(74) *Attorney, Agent, or Firm* — Alston & Bird LLP

(57) ABSTRACT

Systems and methods for determining the integrity of metrology systems are provided. A method according to one implementation includes the step of storing, with a computer having a system clock, an initialization time at which a device is connected to the computer. The method also includes receiving, with the computer, information obtained by the device and associating an electronic timestamp to the information. The electronic timestamp is based on the system clock when the computer receives the information obtained by the device. The method also includes counting clock cycles to determine an elapsed time from the initialization time to the time when the computer receives the information obtained by the device. Also, the method determines if the system clock has been altered by comparing the electronic timestamp to the sum of the initialization time and the elapsed time.

20 Claims, 5 Drawing Sheets

(56) References Cited

U.S. PATENT DOCUMENTS

| | | |
|---|---|---|
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,869,288 B2 | 10/2014 | Conley et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |

(56) References Cited

U.S. PATENT DOCUMENTS

| | | |
|---|---|---|
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |

(56) References Cited

U.S. PATENT DOCUMENTS

| | | |
|---|---|---|
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2002/0169974 A1* | 11/2002 | McKune ............... G06F 21/10 726/31 |
| 2007/0063048 A1 | 3/2007 | Havens et al. |
| 2007/0168687 A1* | 7/2007 | Brokish ............... G06F 1/14 713/502 |
| 2009/0134221 A1 | 5/2009 | Zhu et al. |
| 2009/0287942 A1 | 11/2009 | Betouin et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0016346 A1* | 1/2011 | Lee ............... H03L 7/087 713/503 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2013/0004142 A1* | 1/2013 | Grab ............... H04N 21/25816 386/259 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |

(56) References Cited

U.S. PATENT DOCUMENTS

| | | |
|---|---|---|
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron, Jr. et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |

(56) References Cited

U.S. PATENT DOCUMENTS

| | | |
|---|---|---|
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delano et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2020/0073433 A1* | 3/2020 | Aune ................ G06F 1/10 |

\* cited by examiner

DETERMINING THE INTEGRITY OF A COMPUTING DEVICE

FIELD OF THE INVENTION

The present invention relates to certifying metrology systems and more particularly relates to determining the integrity of computing devices used in metrology systems.

BACKGROUND

Commerce in the United States and other civilized countries relies heavily on the accuracy and integrity of measurement devices. Various measurement devices may include, for example, devices for measuring weight, volume, length, count, and/or other various parameters. In the United States, approximately half of all sales are influenced in some respects by weights and measures regulations. In order for a commercial system to operate effectively and for a satisfactory level of confidence to be provided to buyers and sellers, laws and regulations must be put into place.

Therefore, measurement devices are required to meet certain standards and specifications regarding weights and measures certification. Clearly, one of the goals of measurement regulations is to prevent unethical or deceptive practices.

One common requirement regarding certification is that metrology devices are to maintain a log of measurements that are taken. Also, another requirement may be that electronic timestamps, which include the dates and times when the measurements were obtained, are to be recorded.

Some metrology devices may be stand-alone devices or "built-for-purpose" devices, which may be configured with components for measuring and logging the measurement data. These stand-alone metrology devices may be checked to determine if they meet applicable weights and measures certification, which may include the integrity of the timestamp process.

However, in some environments, a measuring device may be used in conjunction with another device, such as a computer, which may not be required to include the same level of integrity with respect to weights and measures. In these situations, a measuring device certified to meet certain specification may be matched with another device that may be used in an unethical or illegal manner to evade those specifications.

For example, a dimensioner may be used for measuring the dimensions of a package for shipping. The dimensioner may be certified to accurately determine the dimensions of the package to calculate a volume on which shipping costs may be based. However, this dimensioner may be connected with a general-purpose computer, which may be used for storing measurement data and for recording a timestamp indicative of the time and date when the measurement was obtained. If the system clock of the computer is altered, the timestamp information may become unreliable, thereby tainting the overall integrity of the measurement system. Changes to the system clock may be caused inadvertently, but, in other cases, may be caused by fraudulent practices.

Therefore, a need exists for monitoring the system clock of a computer, especially a computer that is incorporated in a measurement system or a computer running software with a time-dependent user license. By monitoring the system clock of the computer, certain deceptive activities can be caught, and buyers and sellers can be assured that ethical commercial practices are being followed.

SUMMARY

Accordingly, the present invention embraces systems and methods for monitoring the integrity of a metrology system. In particular, the system clock of a computer may be analyzed to determine if the clock has been altered.

In an exemplary embodiment, a method for determining whether a system clock has been altered comprises the step of storing, with a computer comprising a system clock, an initialization time at which a device is connected to the computer. The initialization time is based on the system clock. The method also includes receiving, with the computer, information obtained by the device and associating an electronic timestamp to the information. The electronic timestamp is based on the system clock when the computer receives the information obtained by the device. The method also includes counting clock cycles to determine an elapsed time from the initialization time to the time when the computer receives the information obtained by the device. Also, the method includes determining if the system clock has been altered by comparing the electronic timestamp to the sum of the initialization time and the elapsed time.

In another exemplary embodiment, a method comprises the step of monitoring a system time of a general-purpose computer, wherein a system clock of the general-purpose computer is configured to provide the system time. The method also includes utilizing a counter of the general-purpose computer to determine an elapsed time. Also, the method includes employing the system time and elapsed time to determine if the system clock has been altered.

In another exemplary embodiment, a non-transitory computer readable medium for storing a timestamp verifying program is provided. The non-transitory computer readable medium allows a computer to verify an electronic timestamp. The non-transitory computer readable medium is configured to allow the computer to monitor a system time provided by a system clock of a computer and count clock cycles to determine an elapsed time. Furthermore, the non-transitory computer readable medium is configured to allow the computer to employ the system time and elapsed time to determine if the system clock has been altered.

In yet another exemplary embodiment, a system is provided. The system comprises a certified device configured to obtain information related to a plurality of events. The system also includes a general-purpose computer connected to the certified device. The general-purpose computer includes a system clock for providing a system time, a time monitoring module for monitoring the system time, and a counting device for counting clock cycles to determine an elapsed time. The general-purpose computer is configured to apply an electronic timestamp to each of the plurality of events. The time monitoring module is configured to employ the system time and elapsed time to determine if the system clock has been altered.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces systems that include a certified metrology device and an off-the-shelf device, such as a computer. The off-the-shelf device may not necessarily require the same measurement certification as the metrology device with which it operates. Unfortunately, such an unequal pairing can lead to practices that can compromise the integrity of the system. For example, some metrology devices may allow the off-the-shelf device to couple a timestamp with the measurement data. However, if the system clock of the off-the-shelf device is altered, the timestamp will not be reliable.

The present invention is further directed to systems and methods for monitoring a system clock of a computer. By detecting an alteration in the system clock of the computer, the present invention can catch a perpetrator in the act by collecting evidence of unethical alterations. From this point, the evidence of system clock alterations may be used to incriminate the perpetrator.

A software program for performing the system clock analysis can be loaded into the computer to be monitored. The program may be downloaded from a website, installed from an external storage unit, transferred from the metrology device itself, or using other suitable means. By using a software program to perform the system clock analysis, any added costs or design changes to the metrology device can be alleviated.

Figure 1:
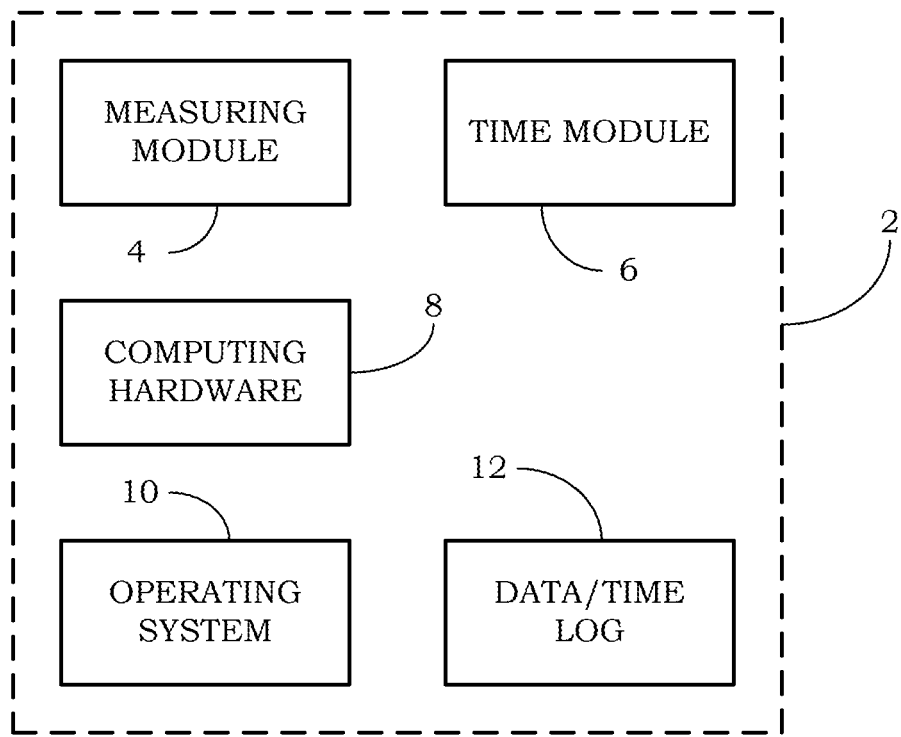
FIG. 1 schematically depicts a block diagram of a stand-alone metrology device, according to an embodiment of the present invention.

FIG. 1 is a block diagram illustrating an embodiment of a metrology device 2 that may be used in a stand-alone manner. The stand-alone metrology device 2 in this example includes at least a measuring module 4, a time module 6, computing hardware 8, an operating system 10, and a data/time log 12. The measuring module 4 may include any number or combination of components for measuring any measurable parameter. The time module 6 may include a clock or other type of timer or counter for determining a date and time when the measurements are taken by the measurement module 4. The time module 6 may further be configured to monitor the clock of the stand-alone metrology device 2. For example, the time module may perform an analysis to determine if the clock is changed to verify that the timestamps are valid.

The measurements and electronic timestamp information may be stored in the data/time log 12. The computing hardware 8 and operating system 10 may include any number or combination of suitable components, such as digital signal processors, central processing units, microprocessors, etc. for controlling the operations of the stand-alone metrology device 2.

Figure 2:
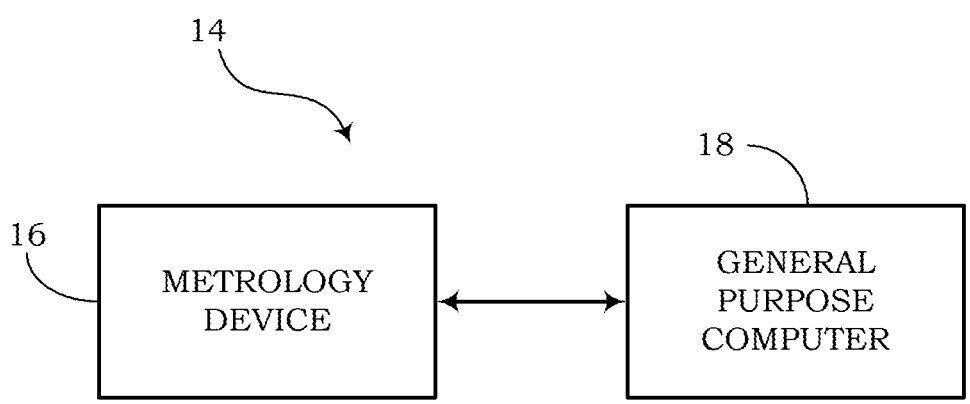
FIG. 2 schematically depicts a block diagram of a metrology system, according to an embodiment of the present invention.

FIG. 2 is a block diagram showing an embodiment of a metrology system 14, which, in this embodiment, includes a metrology device 16 and a general-purpose computer 18. According to this embodiment, the metrology device 16 may not include the same time module 6, computing hardware 8, and operating system 10 as is incorporated in the stand-along metrology device 2 of FIG. 1. Instead, the metrology device 16 shown in FIG. 2 may require the use of the general-purpose computer 18 for performing some of the processing tasks, particularly the application of timestamps.

The general-purpose computer 18 may be a personal computer, a not-built-for-purpose computer, laptop, tablet, smart phone, or other suitable computing device. According to some embodiments, the general-purpose computer 18 may be connected to the metrology device 16, but isolated from any other external communication networks or devices.

The metrology system 14 may include a typical arrangement for many types of metrology devices that may be unable to operate without additional processing power. For example, the metrology device 16 may be a dimensioning device for detecting the volume of an object. When measurements are made, the measurement data may be transmitted to the general-purpose computer 18 for storing the data and for recording timestamps.

Therefore, in operation, the metrology device 16 may be configured to measure one or more parameters, such as weight, volume, length, etc. In some embodiments, the general-purpose computer 18 may first provide an instruction to the metrology device 16 to make these measurements.

The measured parameters may then be stored in the metrology device 16 itself and/or the metrology device 16 may transmit the parameters to the general-purpose computer 18 for storage. The general-purpose computer 18 may be configured to store the data in a suitable memory device. Along with the measurement data, the general-purpose computer 18 may also be configured to store an electronic timestamp. The electronic timestamp may include date and time information using any suitable time format. According to some measurement environments, the day and time information may be important for determining if expiration dates/times have been reached, for calculating shipping costs based on time, and for other reasons.

Therefore, it may be necessary to ensure that hackers or unethical users have not changed the system clock on the general-purpose computer 18 and thereby tampered with the entry of the electronic timestamps. In these types of measurement environments, the integrity of the metrology logging system 14 relies on the accuracy of the timestamps being applied to the measurements.

Figure 3:
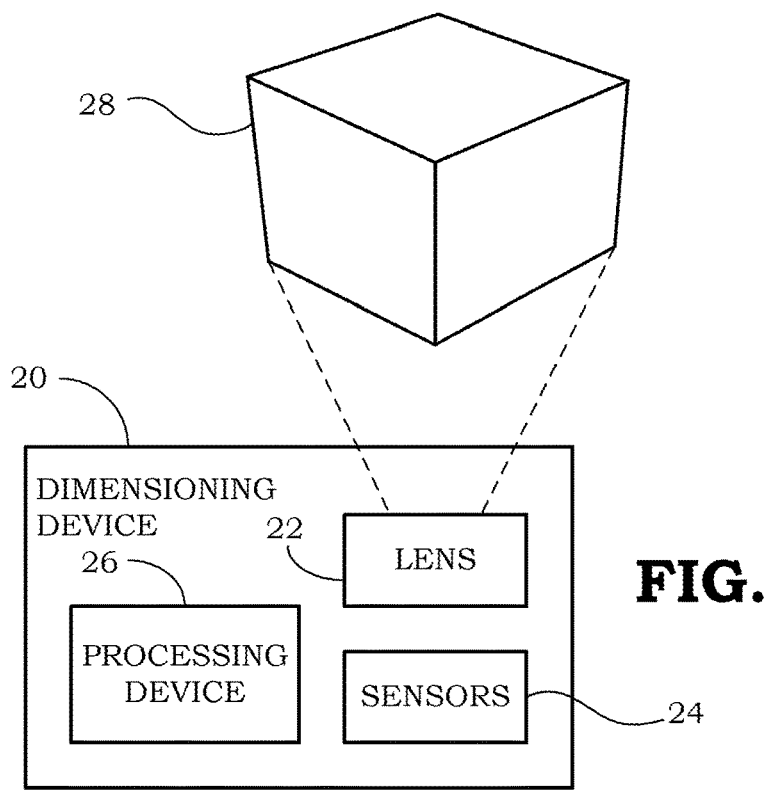
FIG. 3 schematically depicts a block diagram of a dimensioning device, according to an embodiment of the present invention.

FIG. 3 is a block diagram showing an embodiment of a dimensioning device 20 or multi-dimensional measuring device (MDMD). The dimensioning device 20 may be one of multiple types of metrology devices represented by the metrology device 16 shown in FIG. 2 that may be connected to an external device (e.g., computer). In this embodiment of FIG. 3, the dimensioning device 20 includes one or more lenses 22, one or more sensors 24, and a processing device 26. According to one implementation, the dimensioning device 20 may be configured to detect the dimensions of an object 28, such as a box or package.

Figure 4:
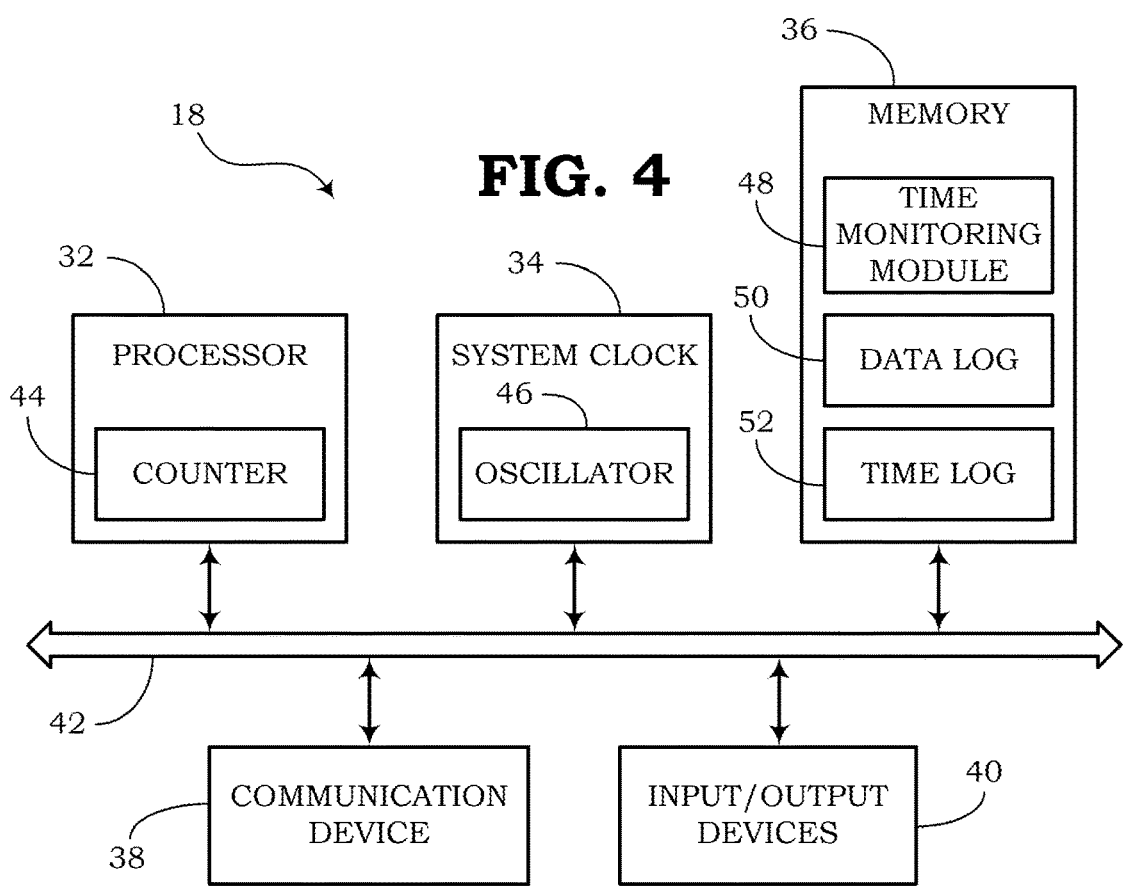
FIG. 4 schematically depicts a block diagram of the general-purpose computer shown in FIG. 2, according to an embodiment of the present invention.

FIG. 4 is a block diagram showing an embodiment of the general-purpose computer 18 shown in FIG. 1. According to the embodiment of FIG. 4, the computer 18 includes a processor 32, a system clock 34, a memory 36, a communication device 38, and input/output devices 40, among other components. The processor 32, system clock 34, memory 36, communication device 38, and input/output devices 40 may communicate with each one another via a bus interface 42.

As illustrated in FIG. 4, the processor 32 may include a counter 44 or other time tracking device for measuring processing cycles, which may be an integer multiple of the cycles of the system clock 34. The system clock 34 may include an oscillator 46, such as a crystal oscillator, for generating a system frequency from which the operating frequencies of various components of the computer 18 may be derived.

Furthermore, the memory 36 of the general-purpose computer 18 may be configured to store data and software in volatile and non-volatile memory components. For example, the memory 36 may include a time monitoring module 48, which may be configured according to the embodiments of the present invention to detect tampering with the system clock 34.

The memory 36 may also include a data log 50 for storing measurement data obtained from the associated metrology device. The memory may also include a time log 52, which may be configured to store timestamp information. Also, the time log 52 may be configured to store events related to detected discrepancies in the timestamps and/or system clock 34. The stored events in the time log 52 may be indicative of tampering events or other events detected by the time monitoring module 48 in which the integrity of the metrology system 14 has been compromised.

The communication device 38 may be configured to communicate with the metrology device 16 when the general-purpose computer 18 is connected in the arrangement shown in FIG. 2. The communication device 38 may send instructions to the metrology device 16 requesting that the metrology device 16 perform a measurement function. Also, the communication device 38 may receive measurement data from the metrology device 16.

According to various embodiments, the communication device 38 may include wired components for connecting the general-purpose computer 18 to the metrology device 16 and/or may include wireless components for allowing the computer 18 and metrology device 16 to communicate wirelessly. For example, wireless communication may include Bluetooth, Wi-Fi, near field communication (NFC), or other suitable wireless protocols.

The input/output devices 40 of the general-purpose computer 18 may include input elements, such as keyboards, keypads, barcode scanners, touch screen devices for receiving user input, microphones, mouse components, and/or other suitable user input elements. Also, the input/output devices 40 may include output elements, such as displays, monitors, speakers, buzzers, tactile output devices, and/or other suitable user output elements.

In some embodiments, the time monitoring module 48 may be configured to operate in conjunction with time-dependent software licenses. For example, if a software license allows a user to use one or more software programs for a predetermined amount of time (e.g., one month), the time monitoring module 48 may be configured to verify that the system clock 34 has not been modified during the duration of the license.

Additionally, the system integrity operations of the present invention may be helpful if a computer is hacked and the hacker attempts to cover his/her tracks by changing the system time of the system clock 34. The present invention is capable of capturing events regarding the system time change, which may be used to detect the hacker. For example, the system integrity operations may be able to catch a hacker who might be able to trick a user into sharing information with a false server that has a different time. The present invention may also be used during a denial or service attack or when a system time is changed to make a certificate validation failure. The present invention can detect and report the issue along with the actual time when the attack was made.

According to the embodiments of the present invention, the time module 6 of the stand-alone metrology device 2 of FIG. 1 and/or the time monitoring module 48 of the general-purpose computer 18 used in the metrology system 14 of FIG. 2 may be configured to monitor the integrity of the respective systems. By monitoring time characteristics, the modules 6 and 48 can detect when a system clock has been altered within their respective systems. Therefore, the time monitoring functions may be used to detect whether the devices within the metrology systems can reliably apply a proper timestamp to measurement data.

Figure 5:
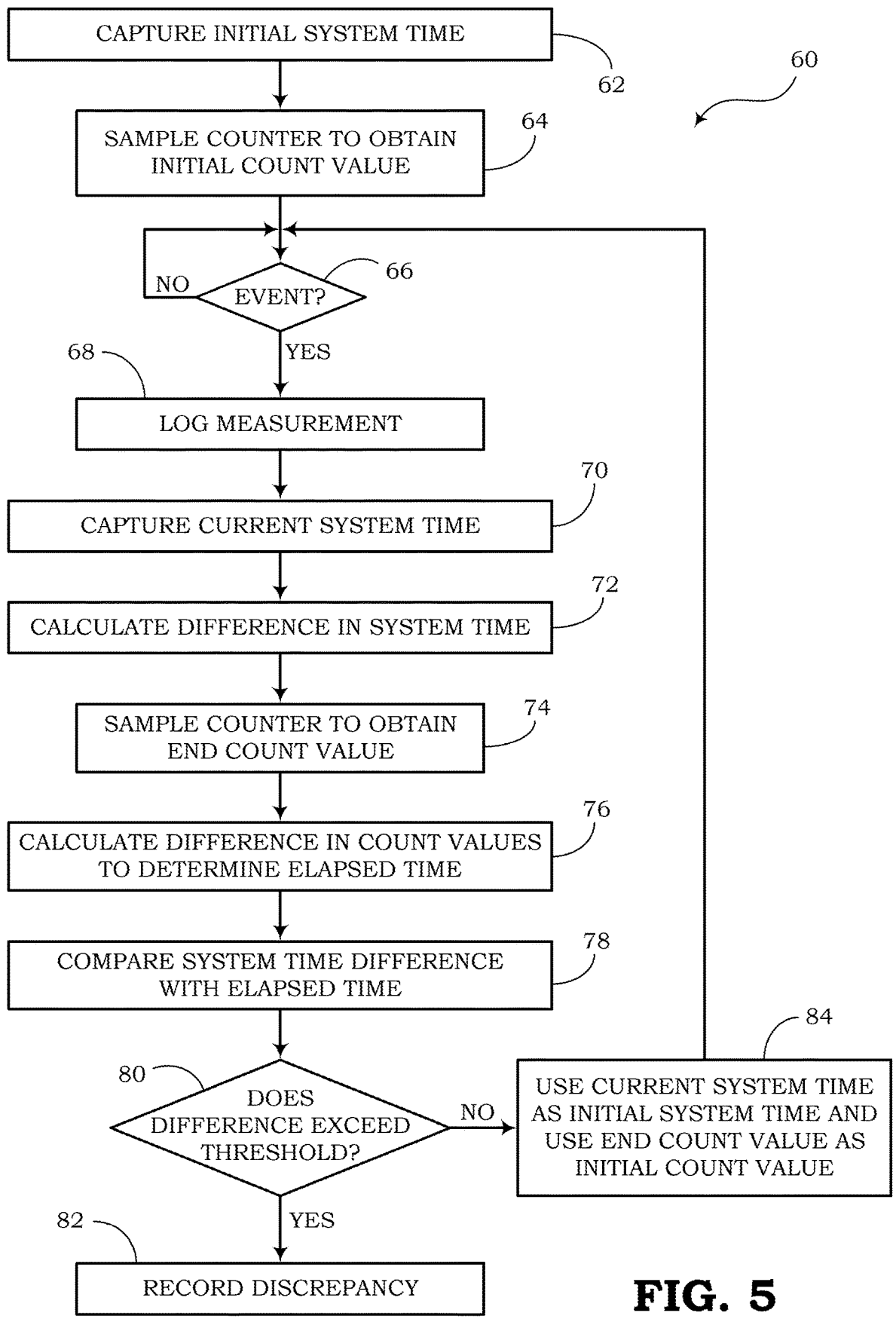
FIG. 5 schematically depicts a flow diagram of a first method for detecting discrepancies in the system time, according to one embodiment of the present invention.
Figure 6:
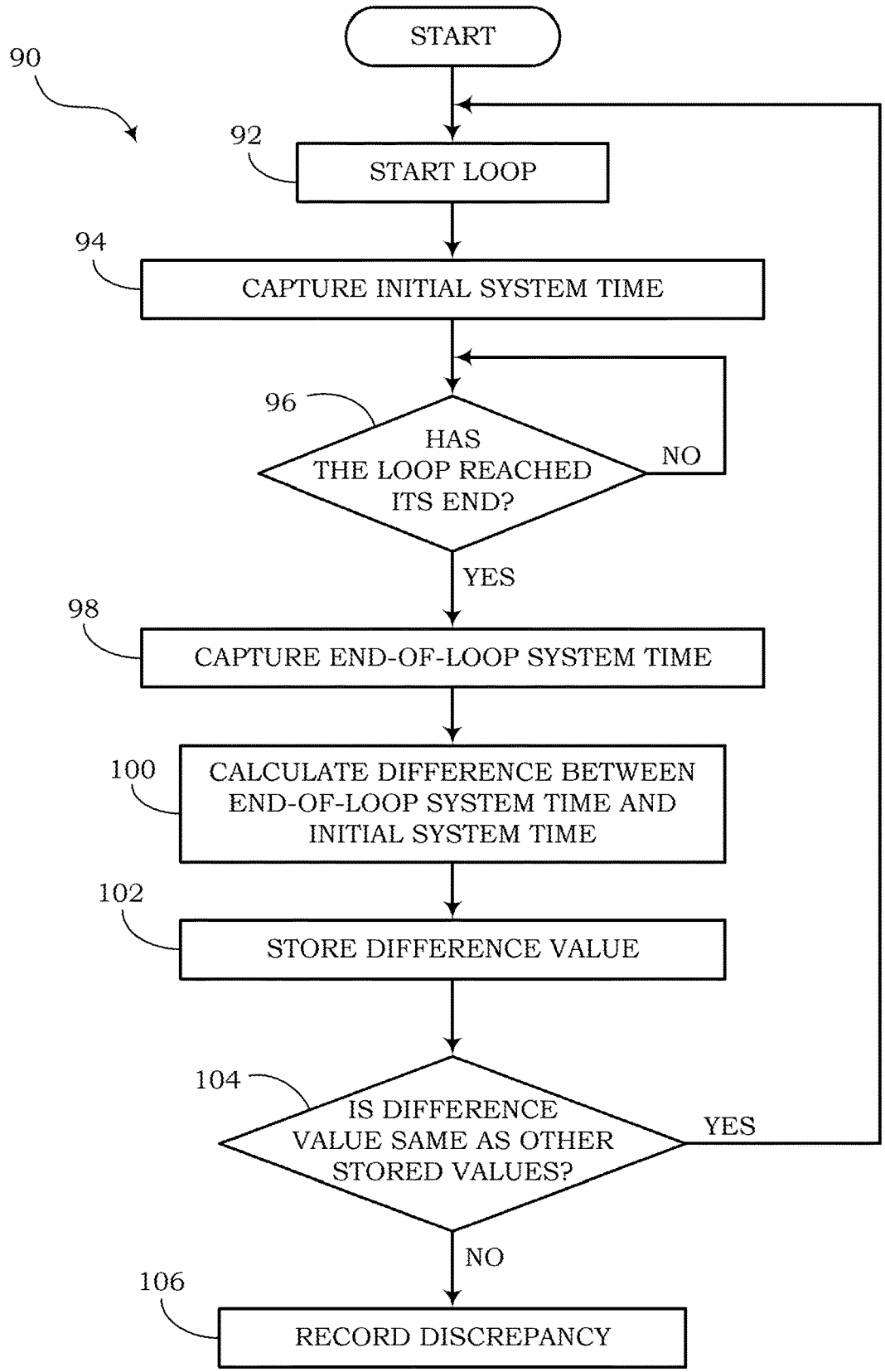
FIG. 6 schematically depicts a flow diagram of a second method for detecting discrepancies in the system time, according to another embodiment of the present invention.
Figure 7:
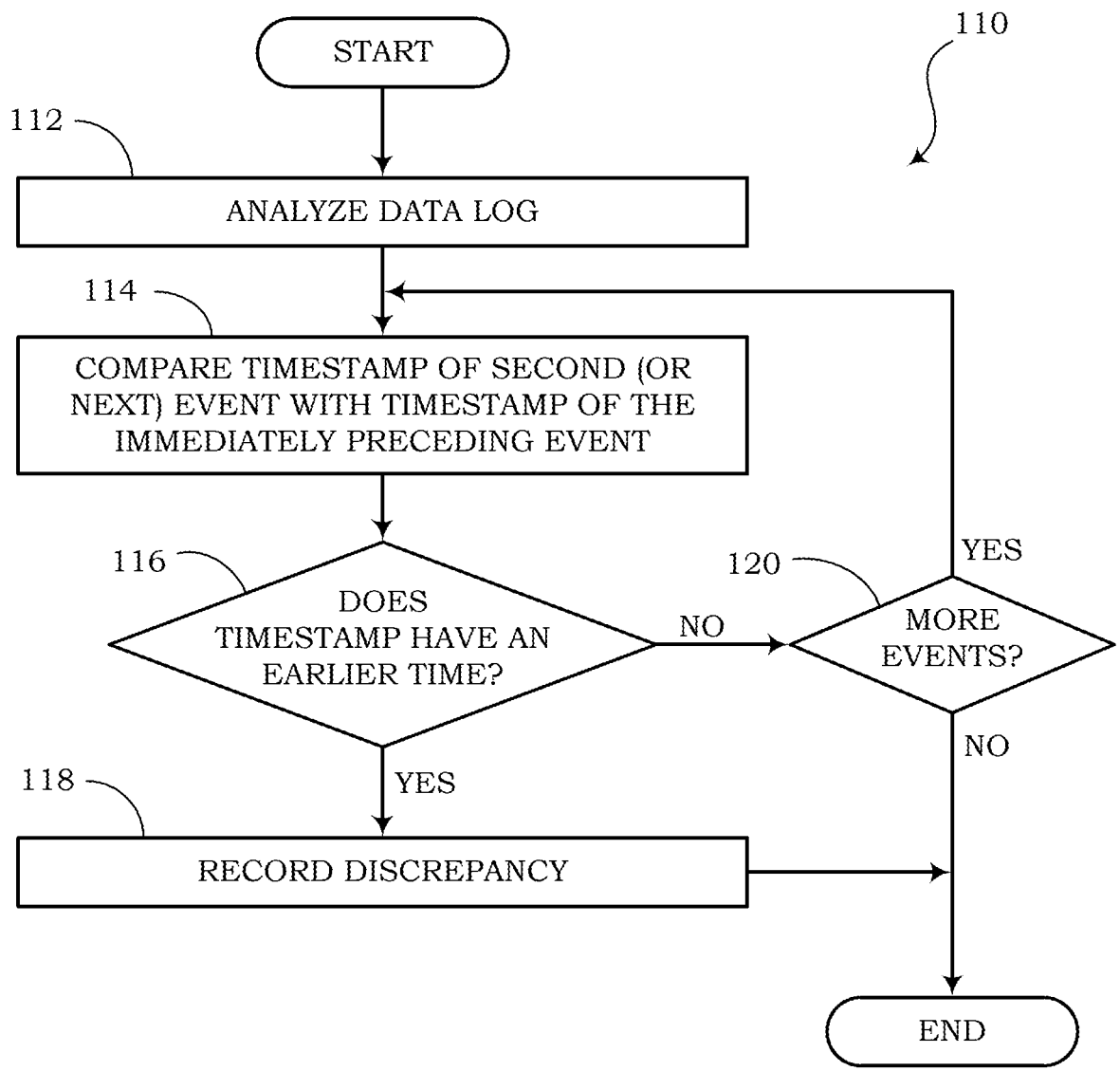
FIG. 7 schematically depicts a flow diagram of a third method for detecting discrepancies in the system time, according to yet another embodiment of the present invention.

The methods described below with respect to FIGS. 5-7 are embodiments of the operations and functionality of the time module 6 and/or time monitoring module 48. It should be noted that other methods may be used to monitor timestamp information to determine if a system clock has been modified during use of a metrology system. The time module 6 and time monitoring module 48 are configured to record events that may be indicative of tampering with the system clock. In some embodiments, the recorded discrepancies and other event information may be stored and protected with encryption.

The embodiments of the present invention may be applicable to metrology systems that are not necessarily connected to an external network, such as a wide-area network (WAN) or the Internet. Instead, the metrology systems may be stand-alone systems and may be configured to detect the integrity of timestamp processes independently of external devices or systems.

However, according to some embodiments, the metrology systems described herein may be connected to external networks to allow additional monitoring of timestamp information. For example, timestamp information may be verified by using an Internet connection, a cellular link, a global positioning system (GPS) reading, or other network-dependent means. Nevertheless, as mentioned above, the time module 6 and time monitoring module 48 may operate independently of the external networks and system, which may thereby simplify the methods and alleviate the need for extensive hardware changes or other costs.

The methods of FIGS. 5-7 may be executed by the time module 6 and/or time monitoring module 48 to assess whether the data log is accurate. The functions of the methods of FIGS. 5-7 may be configured as logic in one or more software programs executed by a suitable processing device. In other embodiments, the functions may be configured in hardware. In some embodiments, software and/or firmware components may be uploaded from the metrology device 16 to the general-purpose computer 18 or downloaded from a network device via a suitable network.

FIG. 5 is a flow diagram showing an embodiment of a first method 60 for detecting discrepancies in the system time. In some implementations, the method 60 may include a first step of initializing a program to open a protected data log, to capture the current system date/time, and to write the data/time information to a log. As shown, the method 60 includes capturing an initial system time, as indicated in block 62. A counter is sampled to obtain an initial count value, as indicated in block 64. The counter may be a microprocessor cycle counter, which may be internal to the computer, for providing a running count of the number of milliseconds since the computer was turned on.

The method 60 also includes the process of waiting for an event (e.g., measurement) to be logged, as indicated in decision diamond 66. If it is determined in decision diamond that there are no events to be logged, then the method 60 repeats the step until a measurement or other event has occurred. When a measurement is obtained or when an event occurs, the method 60 proceeds to block 68.

According to block 68, the method 60 includes logging the measurement or event. As indicated in block 70, the current system time is captured. From the initial system time captured with respect to block 62 and the current system time captured with respect to block 70, a difference in the system time is calculated, as indicated in block 72.

Also, the counter is sampled again, as indicated in block 74, to obtain an end count value. From the initial count value obtained with respect to block 64 and the end count value obtained with respect to block 74, a difference in the count values is calculated to determine elapsed time, as indicated in block 76. The method 60 also includes the step of comparing the system time difference (calculated in block 72) with the elapsed time (calculated in block 76). The comparison of block 78 may include subtracting the two values to determine a difference.

As indicated in decision diamond 80, the method 60 includes the step of determining if the difference (based on the comparison of block 78) exceeds a predetermined threshold. In some embodiments, the predetermined threshold may be set to any minimum level, such as 10 seconds or 20 seconds. If there is a mismatch, or, in other words, if the difference between system time difference and the elapsed time exceeds the predetermined threshold, then the method 60 proceeds from decision diamond 80 to block 82. As indicated in block 82, the discrepancy is recorded. The time that the discrepancy was detected along with other pertinent information may be stored.

If it is determined in decision diamond 80 that the difference does not exceed the threshold, the method 60 may proceed to block 84 and the process repeated. In some embodiments, the method 60 may come to an end at this point if no more events are to be monitored. As indicated in block 84, the current system time that was captured with respect to block 70 is used as an initial time for the next event. Also, the end count value obtained with respect to block 74 is used as an initial count value for the next event. After converting the current values to initial values for use with the next event, the method 60 loops back from block 84 to decision diamond 66 to wait for the next event and the process can be repeated indefinitely.

In order to test the method and verify that changes to the system clock can be reliably captured, a software program may be used. An example of a C# program that compiles using Visual Studio is included below:

```
public partial class Form1 : Form
{
    private int timerCurrentValue = 100;
    private int referenceTickCount = 0;
    private DateTime referenceDateTime;
    public Form1( )
    {
```

-continued

```
        InitializeComponent( );
        referenceTickCount = System.Environment.TickCount;
        referenceDateTime = DateTime.Now;
    }
    private void LogString( string textToLog )
    {
        const Int64 msecTimeChangeThreshold = 500;
        DateTime currentDateTime = DateTime.Now;
        Int64 currentTickCount = System.Environment.TickCount;
        Int64 deltaTicksSinceReference = currentTickCount -
            referenceTickCount;
        Int64 deltaDateTime = currentDateTime.ToBinary( ) -
            referenceDateTime.ToBinary( );
        tbTickCount.Text = currentTickCount.ToString( );
        DateTime logDateTime = DateTime.FromBinary(deltaDateTime);
        string logString = currentDateTime.ToString( ) + " " +
            textToLog + " dTicks(ms): " + deltaTicksSinceReference +
            dTime(min:sec.ms): " +
            logDateTime.Minute.ToString("D2") + ":" +
            logDateTime.Second.ToString("D2") + "." +
            logDateTime.Millisecond.ToString("D3") + "\r\n" ;
        Int64 msecSinceReference = (logDateTime.Minute * 60 * 1000) +
            (logDateTime.Second * 1000) + logDateTime.Millisecond;
        Int64 diffTimeMethods = Math.Abs(deltaTicksSinceReference -
            msecSinceReference);
            if (diffTimeMethods < msecTimeChangeThreshold)
            {
                tbLog.SelectionColor = System.Drawing.Color.Black;
            }
            else
            {
                tbLog.SelectionColor = System.Drawing.Color.Red;
                referenceTickCount = System.Environment.TickCount;
                referenceDateTime = DateTime.Now
            }
        tbLog.AppendText(logString);
    }
}
```

FIG. 6 is a flow diagram showing another embodiment of a method 90 for detecting discrepancies in the system time. In some implementations, the method 90 may be executed in place of method 60 of FIG. 5 or may be executed in parallel with method 60. As shown in FIG. 6, method 90 includes a first step of starting a loop, as indicated in block 92. The loop may be configured to endure for a certain amount of time (e.g., ten seconds). As indicated in block 94, an initial system time is captured. The method 90 also includes waiting for the end of the loop. As indicated in decision block 96, it is determined whether or not the loop has reached its end. If not, the decision block 96 is repeated until the end is reached, at which point, the method proceeds to block 98.

As indicated in block 98, an end-of-loop system time is captured. A difference between the end-of-loop system time (captured with respect to block 98) and the initial system time (captured with respect to block 94) is calculated, as indicated in block 100. This difference value is then stored, as indicated in block 102.

The method 90 also include a decision diamond 104, which determines whether the difference value (calculated with respect to block 100) is the same as other stored difference values that may have been calculated and stored during previous loops having the same time periods (e.g., ten seconds). If the values are the same, then no issues are detected, and the method 90 loops back to block 92 to repeat the process for the next loop. This process may be repeated indefinitely or until it is determined that a discrepancy is detected. If a discrepancy is detected in decision diamond 104, the method 90 proceeds to block 106, which indicates that the discrepancy is recorded.

The loop may be repeated over and over and the initial loop value may be compared with end loop value. This difference should be constant at the end of each loop. However, if the system clock is adjusted, the loop is compromised and will give a different value. The results of the test can be written to a log, such as log 12 (FIG. 1), data log 50 (FIG. 4), or time log 52 (FIG. 4).

In order to test the method 90 and verify that changes to the system clock can be reliably captured, a software program may be used. An example of a Basic language program is included below:

```
REM Timecatcher Program for catching a change in system time
OPEN "timecatch.txt" FOR OUTPUT AS #1 'creates log
NoCatch = 0 'log write flag
PRINT #1, "Timecatcher log start time is "; TIME$
TIMER ON
stp = TIMER
FOR a = 1 TO 4 'ten second loops
    strt = TIMER
    DO UNTIL stp – strt > 10 OR stp – strt < 0 'difference of
            seconds or negative when tampered with
        stp = TIMER
    LOOP
    dif = stp – strt
    t$ = TIME$
    IF INT(dif) <> 10 THEN PRINT #1, "Computer operating
system time changed at "; oldt$: NoCatch = 1
    oldt$ = t$
NEXT a
PRINT #1, "Timecatcher log stop time is "; TIME$
IF NoCatch = 0 THEN PRINT #1, "Computer operating system time
was not tampered with or adjusted during this interval."
CLOSE #1
END
```

FIG. 7 is a flow diagram showing an embodiment of a third method 110 for detecting discrepancies in the system time. According to this method 110, a data log is analyzed, as indicated in block 112, for determining if timestamps are sequential. As indicated in block 114, the timestamp of a present event (or subsequent event) is compared with the timestamp of an event that immediately precedes the present event.

It should be clear that the next event should have a timestamp that indicates a later time than the earlier event. The decision diamond 116 indicates that the comparison of block 114 is analyzed to determine if the next event has a timestamp that has been marked with an earlier time. If such an out-of-sequence event is detected, the method 110 includes proceeding to block 118, which indicates that the discrepancy is recorded. Otherwise, if the event is recorded with a timestamp that properly follows the earlier event, then the method may proceed to decision diamond 120, which determines whether more events are to be analyzed. If so, the method 110 loops back to block 114 to repeat the analysis of the data log. Otherwise, the method 110 may come to an end.

It is beneficial to maintain the integrity of the data log. In some cases, it may be even more important to detect when the time on a computer is moved back since subsequent fraudulent measurements may replace an actual measurement taken at the same system time. The method of FIG. 7 is therefore a simple process for detecting when the system clock has been moved to an earlier time.

The method of FIG. 7 can detect a negative time change. Also, the method does not necessarily need to run during the capturing of events. A data log can be analyzed after the fact to determine if any timestamps are out of sequence. When a subsequent timestamp is determined to have an earlier system time, then an error is detected.

The methods of FIGS. 5-7 and other suitable methods may be used to catch a hacker in the act of changing a system time. By recording information related to the time change, further action can be taken to catch the hackers, nefarious users of time-limited software licenses, or other culprits responsible for changing the time.

In steps 82, 106, and 118 of the respective methods, when the discrepancy is recorded, the method may further be configured to lock the metrology device or computer so that no further actions can be taken until the issues are resolved. In some cases, freezing the metrology device or computer may be required in response to detecting the discrepancy, as regulated by various jurisdictions. A message may be displayed on an output device 40 to communicate to the user that the metrology device cannot be used until it is checked by an inspector.

Similarly, the metrology systems with detected discrepancies may be programmed to require a manager to "sign-off" in order to continue operation. A report may be sent to local authorities explaining the discrepancy, such as via email. The report may be accessed when the metrology device is scheduled for a regular field test. An inspector may be able to review the report and determine if additional discrepancies have been repeated. It may be necessary in some cases to use the recorded information of the time discrepancy in a criminal proceeding.

In some embodiments, the recording of the discrepancy (e.g., blocks 82, 106, 118) may not include additional actions other than the simple storing of the time-discrepancy event information. However, if a customer complaint is received regarding the particular metrology device, an inspector can check the log to see if any time-discrepancy events have been recorded.

The systems and methods described herein may be considered as a simple solution for detecting discrepancies in the system clock of a general-purpose computer or in a programmable stand-alone metrology device. The systems and methods may be used in jurisdictions that require a Certificate of Conformance for measurement systems. Otherwise, tampered systems might result in charging customers incorrect amounts.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898;

8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140;

U.S. Design Pat. Nos. D702,237; D716,285; D723,560; D730,357; D730,901; D730,902; D734,339; D737,321; D754,205; D754,206; D757,009; D760,719; D762,604; D766,244; D777,166; D771,631; D783,601; D785,617; D785,636; D790,505; D790,546;

International Publication No. 2013/163789;

U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent Application Publication No. 2014/0270229; U.S. Patent Application Publication No. 2014/0278387; U.S. Patent Application Publication No. 2014/0288933; U.S. Patent Application Publication No. 2014/0297058; U.S.

Patent Application Publication No. 2014/0299665; U.S.
Patent Application Publication No. 2014/0332590; U.S.
Patent Application Publication No. 2014/0351317; U.S.
Patent Application Publication No. 2014/0362184; U.S.
Patent Application Publication No. 2014/0363015; U.S.
Patent Application Publication No. 2014/0369511; U.S.
Patent Application Publication No. 2014/0374483; U.S.
Patent Application Publication No. 2014/0374485; U.S.
Patent Application Publication No. 2015/0001301; U.S.
Patent Application Publication No. 2015/0001304; U.S.
Patent Application Publication No. 2015/0009338; U.S.
Patent Application Publication No. 2015/0014416; U.S.
Patent Application Publication No. 2015/0021397; U.S.
Patent Application Publication No. 2015/0028104; U.S.
Patent Application Publication No. 2015/0029002; U.S.
Patent Application Publication No. 2015/0032709; U.S.
Patent Application Publication No. 2015/0039309; U.S.
Patent Application Publication No. 2015/0039878; U.S.
Patent Application Publication No. 2015/0040378; U.S.
Patent Application Publication No. 2015/0049347; U.S.
Patent Application Publication No. 2015/0051992; U.S.
Patent Application Publication No. 2015/0053769; U.S.
Patent Application Publication No. 2015/0062366; U.S.
Patent Application Publication No. 2015/0063215; U.S.
Patent Application Publication No. 2015/0088522; U.S.
Patent Application Publication No. 2015/0096872; U.S.
Patent Application Publication No. 2015/0100196; U.S.
Patent Application Publication No. 2015/0102109; U.S.
Patent Application Publication No. 2015/0115035; U.S.
Patent Application Publication No. 2015/0127791; U.S.
Patent Application Publication No. 2015/0128116; U.S.
Patent Application Publication No. 2015/0133047; U.S.
Patent Application Publication No. 2015/0134470; U.S.
Patent Application Publication No. 2015/0136851; U.S.
Patent Application Publication No. 2015/0142492; U.S.
Patent Application Publication No. 2015/0144692; U.S.
Patent Application Publication No. 2015/0144698; U.S.
Patent Application Publication No. 2015/0149946; U.S.
Patent Application Publication No. 2015/0161429; U.S.
Patent Application Publication No. 2015/0178523; U.S.
Patent Application Publication No. 2015/0178537; U.S.
Patent Application Publication No. 2015/0178685; U.S.
Patent Application Publication No. 2015/0181109; U.S.
Patent Application Publication No. 2015/0199957; U.S.
Patent Application Publication No. 2015/0210199; U.S.
Patent Application Publication No. 2015/0212565; U.S.
Patent Application Publication No. 2015/0213647; U.S.
Patent Application Publication No. 2015/0220753; U.S.
Patent Application Publication No. 2015/0220901; U.S.
Patent Application Publication No. 2015/0227189; U.S.
Patent Application Publication No. 2015/0236984; U.S.
Patent Application Publication No. 2015/0239348; U.S.
Patent Application Publication No. 2015/0242658; U.S.
Patent Application Publication No. 2015/0248572; U.S.
Patent Application Publication No. 2015/0254485; U.S.
Patent Application Publication No. 2015/0261643; U.S.
Patent Application Publication No. 2015/0264624; U.S.
Patent Application Publication No. 2015/0268971; U.S.
Patent Application Publication No. 2015/0269402; U.S.
Patent Application Publication No. 2015/0288689; U.S.
Patent Application Publication No. 2015/0288896; U.S.
Patent Application Publication No. 2015/0310243; U.S.
Patent Application Publication No. 2015/0310244; U.S.
Patent Application Publication No. 2015/0310389; U.S.
Patent Application Publication No. 2015/0312780; U.S.
Patent Application Publication No. 2015/0327012; U.S.
Patent Application Publication No. 2016/0014251; U.S.
Patent Application Publication No. 2016/0025697; U.S.
Patent Application Publication No. 2016/0026838; U.S.
Patent Application Publication No. 2016/0026839; U.S.
Patent Application Publication No. 2016/0040982; U.S.
Patent Application Publication No. 2016/0042241; U.S.
Patent Application Publication No. 2016/0057230; U.S.
Patent Application Publication No. 2016/0062473; U.S.
Patent Application Publication No. 2016/0070944; U.S.
Patent Application Publication No. 2016/0092805; U.S.
Patent Application Publication No. 2016/0101936; U.S.
Patent Application Publication No. 2016/0104019; U.S.
Patent Application Publication No. 2016/0104274; U.S.
Patent Application Publication No. 2016/0109219; U.S.
Patent Application Publication No. 2016/0109220; U.S.
Patent Application Publication No. 2016/0109224; U.S.
Patent Application Publication No. 2016/0112631; U.S.
Patent Application Publication No. 2016/0112643; U.S.
Patent Application Publication No. 2016/0117627; U.S.
Patent Application Publication No. 2016/0124516; U.S.
Patent Application Publication No. 2016/0125217; U.S.
Patent Application Publication No. 2016/0125342; U.S.
Patent Application Publication No. 2016/0125873; U.S.
Patent Application Publication No. 2016/0133253; U.S.
Patent Application Publication No. 2016/0171597; U.S.
Patent Application Publication No. 2016/0171666; U.S.
Patent Application Publication No. 2016/0171720; U.S.
Patent Application Publication No. 2016/0171775; U.S.
Patent Application Publication No. 2016/0171777; U.S.
Patent Application Publication No. 2016/0174674; U.S.
Patent Application Publication No. 2016/0178479; U.S.
Patent Application Publication No. 2016/0178685; U.S.
Patent Application Publication No. 2016/0178707; U.S.
Patent Application Publication No. 2016/0179132; U.S.
Patent Application Publication No. 2016/0179143; U.S.
Patent Application Publication No. 2016/0179368; U.S.
Patent Application Publication No. 2016/0179378; U.S.
Patent Application Publication No. 2016/0180130; U.S.
Patent Application Publication No. 2016/0180133; U.S.
Patent Application Publication No. 2016/0180136; U.S.
Patent Application Publication No. 2016/0180594; U.S.
Patent Application Publication No. 2016/0180663; U.S.
Patent Application Publication No. 2016/0180678; U.S.
Patent Application Publication No. 2016/0180713; U.S.
Patent Application Publication No. 2016/0185136; U.S.
Patent Application Publication No. 2016/0185291; U.S.
Patent Application Publication No. 2016/0186926; U.S.
Patent Application Publication No. 2016/0188861; U.S.
Patent Application Publication No. 2016/0188939; U.S.
Patent Application Publication No. 2016/0188940; U.S.
Patent Application Publication No. 2016/0188941; U.S.
Patent Application Publication No. 2016/0188942; U.S.
Patent Application Publication No. 2016/0188943; U.S.
Patent Application Publication No. 2016/0188944; U.S.
Patent Application Publication No. 2016/0189076; U.S.
Patent Application Publication No. 2016/0189087; U.S.
Patent Application Publication No. 2016/0189088; U.S.
Patent Application Publication No. 2016/0189092; U.S.
Patent Application Publication No. 2016/0189284; U.S.
Patent Application Publication No. 2016/0189288; U.S.
Patent Application Publication No. 2016/0189366; U.S.
Patent Application Publication No. 2016/0189443; U.S.
Patent Application Publication No. 2016/0189447; U.S.
Patent Application Publication No. 2016/0189489; U.S.
Patent Application Publication No. 2016/0192051; U.S.
Patent Application Publication No. 2016/0202951; U.S.
Patent Application Publication No. 2016/0202958; U.S.
Patent Application Publication No. 2016/0202959; U.S.

Patent Application Publication No. 2016/0203021; U.S.
Patent Application Publication No. 2016/0203429; U.S.
Patent Application Publication No. 2016/0203797; U.S.
Patent Application Publication No. 2016/0203820; U.S.
Patent Application Publication No. 2016/0204623; U.S.
Patent Application Publication No. 2016/0204636; U.S.
Patent Application Publication No. 2016/0204638; U.S.
Patent Application Publication No. 2016/0227912; U.S.
Patent Application Publication No. 2016/0232891; U.S.
Patent Application Publication No. 2016/0292477; U.S.
Patent Application Publication No. 2016/0294779; U.S.
Patent Application Publication No. 2016/0306769; U.S.
Patent Application Publication No. 2016/0314276; U.S.
Patent Application Publication No. 2016/0314294; U.S.
Patent Application Publication No. 2016/0316190; U.S.
Patent Application Publication No. 2016/0323310; U.S.
Patent Application Publication No. 2016/0325677; U.S.
Patent Application Publication No. 2016/0327614; U.S.
Patent Application Publication No. 2016/0327930; U.S.
Patent Application Publication No. 2016/0328762; U.S.
Patent Application Publication No. 2016/0330218; U.S.
Patent Application Publication No. 2016/0343163; U.S.
Patent Application Publication No. 2016/0343176; U.S.
Patent Application Publication No. 2016/0364914; U.S.
Patent Application Publication No. 2016/0370220; U.S.
Patent Application Publication No. 2016/0372282; U.S.
Patent Application Publication No. 2016/0373847; U.S.
Patent Application Publication No. 2016/0377414; U.S.
Patent Application Publication No. 2016/0377417; U.S.
Patent Application Publication No. 2017/0010141; U.S.
Patent Application Publication No. 2017/0010328; U.S.
Patent Application Publication No. 2017/0010780; U.S.
Patent Application Publication No. 2017/0016714; U.S.
Patent Application Publication No. 2017/0018094; U.S.
Patent Application Publication No. 2017/0046603; U.S.
Patent Application Publication No. 2017/0047864; U.S.
Patent Application Publication No. 2017/0053146; U.S.
Patent Application Publication No. 2017/0053147; U.S.
Patent Application Publication No. 2017/0053647; U.S.
Patent Application Publication No. 2017/0055606; U.S.
Patent Application Publication No. 2017/0060316; U.S.
Patent Application Publication No. 2017/0061961; U.S.
Patent Application Publication No. 2017/0064634; U.S.
Patent Application Publication No. 2017/0083730; U.S.
Patent Application Publication No. 2017/0091502; U.S.
Patent Application Publication No. 2017/0091706; U.S.
Patent Application Publication No. 2017/0091741; U.S.
Patent Application Publication No. 2017/0091904; U.S.
Patent Application Publication No. 2017/0092908; U.S.
Patent Application Publication No. 2017/0094238; U.S.
Patent Application Publication No. 2017/0098947; U.S.
Patent Application Publication No. 2017/0100949; U.S.
Patent Application Publication No. 2017/0108838; U.S.
Patent Application Publication No. 2017/0108895; U.S.
Patent Application Publication No. 2017/0118355; U.S.
Patent Application Publication No. 2017/0123598; U.S.
Patent Application Publication No. 2017/0124369; U.S.
Patent Application Publication No. 2017/0124396; U.S.
Patent Application Publication No. 2017/0124687; U.S.
Patent Application Publication No. 2017/0126873; U.S.
Patent Application Publication No. 2017/0126904; U.S.
Patent Application Publication No. 2017/0139012; U.S.
Patent Application Publication No. 2017/0140329; U.S.
Patent Application Publication No. 2017/0140731; U.S.
Patent Application Publication No. 2017/0147847; U.S.
Patent Application Publication No. 2017/0150124; U.S.
Patent Application Publication No. 2017/0169198; U.S.
Patent Application Publication No. 2017/0171035; U.S.
Patent Application Publication No. 2017/0171703; U.S.
Patent Application Publication No. 2017/0171803; U.S.
Patent Application Publication No. 2017/0180359; U.S.
Patent Application Publication No. 2017/0180577; U.S.
Patent Application Publication No. 2017/0181299; U.S.
Patent Application Publication No. 2017/0190192; U.S.
Patent Application Publication No. 2017/0193432; U.S.
Patent Application Publication No. 2017/0193461; U.S.
Patent Application Publication No. 2017/0193727; U.S.
Patent Application Publication No. 2017/0199266; U.S.
Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for determining whether a system clock has been altered, the method comprising the steps of:
    capturing, with a computer comprising a system clock, an initial system time and an initial counter value when a device is connected to the computer, wherein the initial system time and the initial counter value are based on the system clock;
    receiving, with the computer, information obtained by the device;
    capturing, with the computer, a current system time and a current counter value when the information is obtained, wherein the current system time and the current counter value are based on the system clock;
    determining, with the computer, a first time-calculation representing a difference in time between the initial system time and the current system time;
    determining, with the computer, a second time-calculation representing a difference between the initial counter value and the current counter value;
    comparing, with the computer, the first time-calculation and the second time-calculation to determine that a mismatch exists; and
    determining that the system clock has been altered based on the comparison.

2. The method of claim 1, further comprising the step of communicating a data entry from the device to the computer, wherein the computer is configured to log the data entry with an electronic timestamp.

3. The method of claim 2, wherein the device is a certified dimensioning device or multi-dimensional measuring device (MDMD).

4. The method of claim 2, wherein, in response to determining that the system clock has been altered, the method further comprises the step of communicating time alteration information from the computer to the device.

5. The method of claim 4, wherein, in response to determining that the system clock has been altered, the method further comprises the step of preventing the device from obtaining additional data.

6. The method of claim 1, wherein, when the mismatch exists, the method further comprises the step of recording information regarding the mismatch in a time integrity log.

7. The method of claim 1, wherein the mismatch is detected when the difference between the first time-calculation and the second time-calculation exceeds a predetermined threshold.

8. The method of claim 1, further comprising the steps of:
starting a loop having a predetermined time period;
capturing an initial system time at the start of the loop;
detecting an ending system time at the end of the loop;
calculating a difference in time between the initial system time and the ending system time;
determining whether the calculated difference is the same as other calculated differences for other loops having the predetermined time period; and
detecting that the system clock has been altered when the calculated difference is not the same as the other calculated differences.

9. The method of claim 1, further comprising the steps of:
comparing a timestamp related to a particular event with a timestamp related to another event immediately preceding the particular event; and
determining an alteration incident when the timestamp related to the particular event includes an earlier time than the time of the timestamp related to the other event.

10. A non-transitory computer readable medium for storing a timestamp verifying program that determines whether a system clock of a computer has been altered, the non-transitory computer readable medium configured to allow the computer to:
start a loop having a predetermined time period;
capture an initial system time at the start of the loop;
capture an ending system time at the end of the loop;
calculate a difference in time between the initial system time and the ending system time;
determine whether the calculated difference is the same as other calculated differences for other loops having the predetermined time period; and
determine that the system clock has been altered when the calculated difference is not the same as the other calculated differences.

11. The non-transitory computer readable medium of claim 10, further configured to allow the computer to receive a data entry from a metrology device and log the data entry with an electronic timestamp.

12. The non-transitory computer readable medium of claim 10, further configured to allow the computer to:
capture an initial system time and an initial counter value;
log an event;
capture a current system time when the event is logged;
sample a current counter value when the event is logged;
determine a first time-calculation representing a difference in time between the initial system time and the current system time;
determine a second time-calculation representing a difference between the initial counter value and the current counter value; and
compare the first time-calculation and the second time-calculation to determine if a mismatch exists.

13. The non-transitory computer readable medium of claim 10, further configured to allow the computer to:
compare a timestamp related to a particular event with a timestamp related to another event immediately preceding the particular event; and
determine an alteration incident when the timestamp related to the particular event includes an earlier time than the time of the timestamp related to the other event.

14. A system comprising:
a device configured to obtain information related to an event; and
a computer connected to the device, wherein the computer comprises a system clock for providing a system time, and wherein the computer is configured to:
capture an initial system time and an initial counter value when a device is connected to the computer, wherein the initial system time and the initial counter value are based on the system clock;
receive information obtained by the device;
capture a current system time and a current counter value when the information is obtained, wherein the current system time and the current counter value are based on the system clock;
determine a first time-calculation representing a difference in time between the initial system time and the current system time;
determine a second time-calculation representing a difference between the initial counter value and the current counter value;
compare the first time-calculation and the second time-calculation to determine that a mismatch exists; and
determine that the system clock has been altered based on the comparison.

15. The system of claim 14, wherein the device is a certified metrology device for determining dimensions of an object and wherein the information related to the event includes at least measurements of the dimensions of the object.

16. The system of claim 14, wherein the computer further comprises a time integrity log, wherein, when the computer determines that the system clock has been altered, the computer is configured to record information regarding a concurrent event in the time integrity log.

17. The system of claim 14, wherein the computer comprises a data log configured to store the information related to the event.

18. The non-transitory computer readable medium of claim 10, wherein the mismatch is detected when the difference between the first time-calculation and the second time-calculation exceeds a predetermined threshold.

19. The system of claim 14, wherein the mismatch is detected when the difference between the first time-calculation and the second time-calculation exceeds a predetermined threshold.

20. The system of claim 14, wherein the computer is further configured to:
start a loop having a predetermined time period;
capture an initial system time at the start of the loop;
detect an ending system time at the end of the loop;
calculate a difference in time between the initial system time and the ending system time;
determine whether the calculated difference is the same as other calculated differences for other loops having the predetermined time period; and
detect that the system clock has been altered when the calculated difference is not the same as the other calculated differences.

* * * * *